United States Patent
Johnston et al.

(10) Patent No.: US 8,402,776 B2
(45) Date of Patent: *Mar. 26, 2013

(54) THERMAL MANAGEMENT SYSTEM WITH DUAL MODE COOLANT LOOPS

(75) Inventors: Vincent George Johnston, Half Moon Bay, CA (US); Andrew David Baglino, San Francisco, CA (US); Scott Ira Kohn, Redwood City, CA (US); Vineet Haresh Mehta, San Francisco, CA (US); Christopher David Gadda, Palo Alto, CA (US); Curt Raymond O'Donnell, Sunnyvale, CA (US); Wulfer Adrijan de Bruijn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,269

(22) Filed: Mar. 23, 2012

(65) Prior Publication Data

US 2012/0183815 A1 Jul. 19, 2012

Related U.S. Application Data

(63) Continuation-in-part of application No. 12/835,486, filed on Jul. 13, 2010, now Pat. No. 8,336,319.

(51) Int. Cl.
*F25B 7/00* (2006.01)
(52) U.S. Cl. .............................. 62/79; 62/513
(58) Field of Classification Search ........... 62/79, 324.6, 62/513, 160, 118, 434
See application file for complete search history.

(56) References Cited

U.S. PATENT DOCUMENTS

| | | | |
|---|---|---|---|
| 3,985,110 A * | 10/1976 | Doundoulakis | 123/215 |
| 5,035,115 A | 7/1991 | Ptasinski | |
| 5,058,391 A | 10/1991 | Periot | |
| 5,291,960 A | 3/1994 | Brandenburg et al. | |
| 5,339,776 A | 8/1994 | Regueiro | |
| 5,483,807 A | 1/1996 | Abersfelder et al. | |
| 5,537,956 A | 7/1996 | Rennfeld et al. | |
| 5,542,387 A * | 8/1996 | Okubo | 123/192.2 |
| 5,584,360 A | 12/1996 | Wedeven | |
| 5,604,441 A | 2/1997 | Freese et al. | |
| 5,647,534 A | 7/1997 | Kelz et al. | |
| 5,669,335 A | 9/1997 | Hollis | |
| 5,705,742 A | 1/1998 | Fox et al. | |
| 6,124,644 A | 9/2000 | Olson et al. | |
| 6,138,466 A * | 10/2000 | Lake et al. | 62/199 |
| 6,186,254 B1 | 2/2001 | Mufford et al. | |
| 6,209,331 B1 * | 4/2001 | Lake et al. | 62/180 |
| 6,213,233 B1 | 4/2001 | Sonntag et al. | |
| 6,305,345 B1 | 10/2001 | Bakhtine | |
| 6,347,528 B1 | 2/2002 | Iritani et al. | |
| 6,357,541 B1 | 3/2002 | Matsuda et al. | |
| 6,360,835 B1 | 3/2002 | Skala | |
| 6,394,207 B1 | 5/2002 | Skala | |
| 6,448,535 B1 | 9/2002 | Ap | |

(Continued)

*Primary Examiner* — Mohammad Ali
(74) *Attorney, Agent, or Firm* — Patent Law Office of David G. Beck (57) ABSTRACT

A dual mode, thermal management system for use in a vehicle is provided. At a minimum, the system includes a first coolant loop in thermal communication with a battery system, a second coolant loop in thermal communication with at least one drive train component (e.g., electric motor, power electronics, inverter), a dual mode valve system that provides means for selecting between a first mode where the two coolant loops operate in parallel and a second mode where the two coolant loops operate in series, and a coolant reservoir that is coupled to both coolant loops when the two coolant loops are operating in series and only coupled to the drive train coolant loop when the two coolant loops are operating in parallel.

23 Claims, 8 Drawing Sheets

U.S. PATENT DOCUMENTS

| | | |
|---|---|---|
| 6,464,027 B1 | 10/2002 | Dage |
| 6,467,286 B2 | 10/2002 | Hasebe et al. |
| 6,481,230 B2 | 11/2002 | Kimishima et al. |
| 6,561,155 B1 | 5/2003 | Williams |
| 6,569,550 B2 | 5/2003 | Khelifa |
| 6,575,258 B1 | 6/2003 | Clemmer |
| 6,651,761 B1 | 11/2003 | Hrovat et al. |
| 6,708,513 B2 | 3/2004 | Koehler et al. |
| 6,743,539 B2 | 6/2004 | Clingerman et al. |
| 6,772,603 B2 | 8/2004 | Hsu et al. |
| 6,797,421 B2 | 9/2004 | Assarabowski et al. |
| 7,048,044 B2 | 5/2006 | Ban et al. |
| 7,104,347 B2 * | 9/2006 | Severinsky et al. ........ 180/65.23 |
| 7,147,071 B2 | 12/2006 | Gering et al. |
| 7,150,159 B1 | 12/2006 | Brummett et al. |
| 7,191,858 B2 | 3/2007 | Vanderwees et al. |
| 7,237,634 B2 * | 7/2007 | Severinsky et al. ........ 180/65.23 |
| 7,259,469 B2 | 8/2007 | Brummett et al. |
| 7,591,143 B2 | 9/2009 | Zeigler et al. |
| 7,591,303 B2 | 9/2009 | Zeigler et al. |
| 2002/0027027 A1 | 3/2002 | Skala |
| 2002/0040896 A1 | 4/2002 | Ap |
| 2003/0193009 A1 | 10/2003 | Dill |
| 2003/0217876 A1 * | 11/2003 | Severinsky et al. ......... 180/65.2 |
| 2005/0115748 A1 * | 6/2005 | Lanier .......................... 180/65.1 |
| 2005/0133215 A1 | 6/2005 | Ziehr et al. |
| 2005/0241865 A1 | 11/2005 | Varenne |
| 2006/0100057 A1 * | 5/2006 | Severinsky et al. ................ 477/4 |
| 2006/0231305 A1 * | 10/2006 | Severinsky et al. ......... 180/65.2 |
| 2008/0048457 A1 * | 2/2008 | Patel et al. ..................... 290/1 R |
| 2008/0251235 A1 | 10/2008 | Peng |
| 2009/0024256 A1 | 1/2009 | Adams et al. |
| 2009/0139781 A1 * | 6/2009 | Straubel ....................... 180/65.1 |
| 2009/0227194 A1 | 9/2009 | Johnston |
| 2009/0280395 A1 | 11/2009 | Nemesh et al. |

* cited by examiner

THERMAL MANAGEMENT SYSTEM WITH DUAL MODE COOLANT LOOPS

CROSS-REFERENCE TO RELATED APPLICATION

This application is a continuation-in-part of U.S. patent application Ser. No. 12/835,486, filed 13 Jul. 2010, which claims the benefit of the filing date of U.S. Provisional Patent Application Ser. No. 61/351,800, filed Jun. 4, 2010, the disclosures of which are incorporated herein by reference for any and all purposes.

FIELD OF THE INVENTION

The present invention relates generally to thermal control systems and, more particularly, to a vehicle thermal management architecture that allows thermal and performance optimization depending upon ambient conditions and component operating characteristics.

BACKGROUND OF THE INVENTION

An extremely large percentage of the world's vehicles run on gasoline using an internal combustion engine. The use of such vehicles, more specifically the use of vehicles which rely on fossil fuels, i.e., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles offer one of the most promising alternatives to vehicles that use internal combustion drive trains. One of the principal issues involved in designing an efficient electric drive train as well as a vehicle that is "user friendly" is thermal management, primarily due to the required operating conditions of the battery cells and the need to provide on-demand heating and cooling within the passenger cabin. As a result, the thermal management systems used in many electric and hybrid vehicles have limited capabilities and/or are overly complex. For example, early generation electric vehicles often used multiple independent thermal management subsystems. Such an approach is inherently inefficient as each subsystem requires its own components (e.g., pumps, valves, refrigerant systems, etc.).

To overcome some of the problems associated with the use of independent thermal subsystems, U.S. Pat. No. 6,360,835 and related U.S. Pat. No. 6,394,207 disclose a thermal management system utilizing multiple heat transfer circuits which share the same heat transfer medium. The heat transfer circuits are in fluid communication with one another, thus allowing hot heat transfer medium to flow from the high temperature circuit into the low temperature circuit, and cooler heat transfer medium to flow from the low temperature circuit into the high temperature circuit. Although this system appears to overcome some of the limitations of the prior systems, it is still relatively complex due to the interaction of the two heat transfer circuits.

In an alternate thermal control system disclosed in co-pending U.S. patent application Ser. No. 11/786,108, an efficient cooling system is disclosed that utilizes multiple cooling loops and a single heat exchanger. The cooling loops in at least one disclosed embodiment include a cooling loop associated with the battery system, a cooling loop associated with the HVAC system, and a cooling loop associated with the drive system (e.g., motor).

Although the prior art discloses multiple techniques for cooling the motor and/or batteries in an electric vehicle, and in some instances combining such cooling with the vehicle's passenger compartment HVAC system, further system simplification and system efficiency improvements are desired. The present invention provides such a thermal management system.

SUMMARY OF THE INVENTION

The present invention provides a dual mode, thermal management system for use in a vehicle (e.g., an electric vehicle). At a minimum, the system includes a first coolant loop in thermal communication with a battery, a second coolant loop in thermal communication with at least one drive train component (e.g., electric motor, power electronics, inverter), a dual mode valve system that provides means for selecting between a first mode where the two coolant loops operate in parallel and a second mode where the two coolant loops operate in series, and a coolant reservoir that is coupled to both coolant loops when the two coolant loops are operating in series and only coupled to the drive train coolant loop when the two coolant loops are operating in parallel. The dual mode valve system may be comprised of a four-way valve configured such that in one mode valve inlet A is coupled to valve outlet A and valve inlet B is coupled to valve outlet B, and in a second mode valve inlet A is coupled to valve outlet B and valve inlet B is coupled to valve outlet A. The dual mode valve system may be comprised of a four-way valve configured such that in one mode a first portion of the first coolant loop is coupled to a second portion of the first coolant loop and a first portion of the second coolant loop is coupled to a second portion of the second coolant loop, and in a second mode the first portion of the first coolant loop is coupled to the second portion of the second coolant loop and the first portion of the second coolant loop is coupled to the second portion of the first coolant loop. The dual mode valve system may be comprised of a pair of three-way valves configured such that the first three-way valve couples a first portion of the first coolant loop to a second portion of the first coolant loop when the dual mode valve system is configured in the first mode; the second three-way valve couples a first portion of the second coolant loop to a second portion of the second coolant loop when the dual mode valve system is configured in the first mode; the first three-way valve couples the first portion of the first coolant loop to the second portion of the second coolant loop when the dual mode valve system is configured in the second mode; and the second three-way valve couples the first portion of the second coolant loop to the second portion of the first coolant loop when the dual mode valve system is configured in the second mode. The system may include a refrigeration subsystem in thermal communication with the first coolant loop, for example using a heat exchanger, the refrigeration subsystem including, for example, a refrigerant, compressor, condenser and thermostatic expansion valve. The system may include a heater in thermal communication with the first coolant loop. The system may include a charger in thermal communication with the second coolant loop. The second coolant loop may include a radiator, for example coupled to the second coolant loop using a bypass valve, where the bypass valve allows the second coolant loop to either be coupled to, or decoupled from, the radiator. The system may further include a refrigeration subsystem in thermal communication with the first coolant loop via a heat exchanger, and a cabin HVAC system coupleable to the refrigeration subsystem.

In another aspect of the invention, a method of managing thermal loads within an electric vehicle is provided, the method including the steps of selecting between a first mode and a second mode of circulating coolant through a drive train coolant loop and a battery coolant loop, where in the first mode coolant is circulated in the drive train and battery system coolant loops in parallel while in the second mode coolant is circulated serially through the drive train and battery coolant loops, where a coolant reservoir is coupled to the drive train coolant loop regardless of the mode, and where the coolant reservoir is only coupled to the battery system coolant loop when the two coolant loops are operating in series. In the first mode the method may further comprise the steps of coupling a first portion of the drive train coolant loop to a second portion of the drive train coolant loop and coupling a first portion of the battery coolant loop to a second portion of the battery coolant loop, and in the second mode the method may further comprise the steps of coupling the first portion of the drive train coolant loop to the second portion of the battery coolant loop and coupling the first portion of the battery coolant loop to the second portion of the drive train coolant loop. The mode selecting step may utilize a four-way valve or a pair of three-way valves. The method may further comprise the step of thermally coupling a charger to the drive train coolant loop. The method may further comprise the step of thermally coupling a refrigeration subsystem to the battery coolant loop when additional battery cooling is desired. The method may further comprise the step of thermally coupling a heater to the battery coolant loop when additional battery heating is desired. The method may further comprise the step of coupling the drive train coolant loop to a radiator, for example using a bypass valve, when additional drive train cooling is desired.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "battery" and "battery system" may be used interchangeably and as used herein refer to an electrical energy storage system that has the capability to be charged and discharged such as a battery, battery pack, capacitor or supercapacitor. The terms "refrigeration subsystem" and "cooling subsystem" may be used interchangeably and refer to any of a variety of different types of refrigeration/cooling subsystems that may be used to cool other system components and subsystems. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
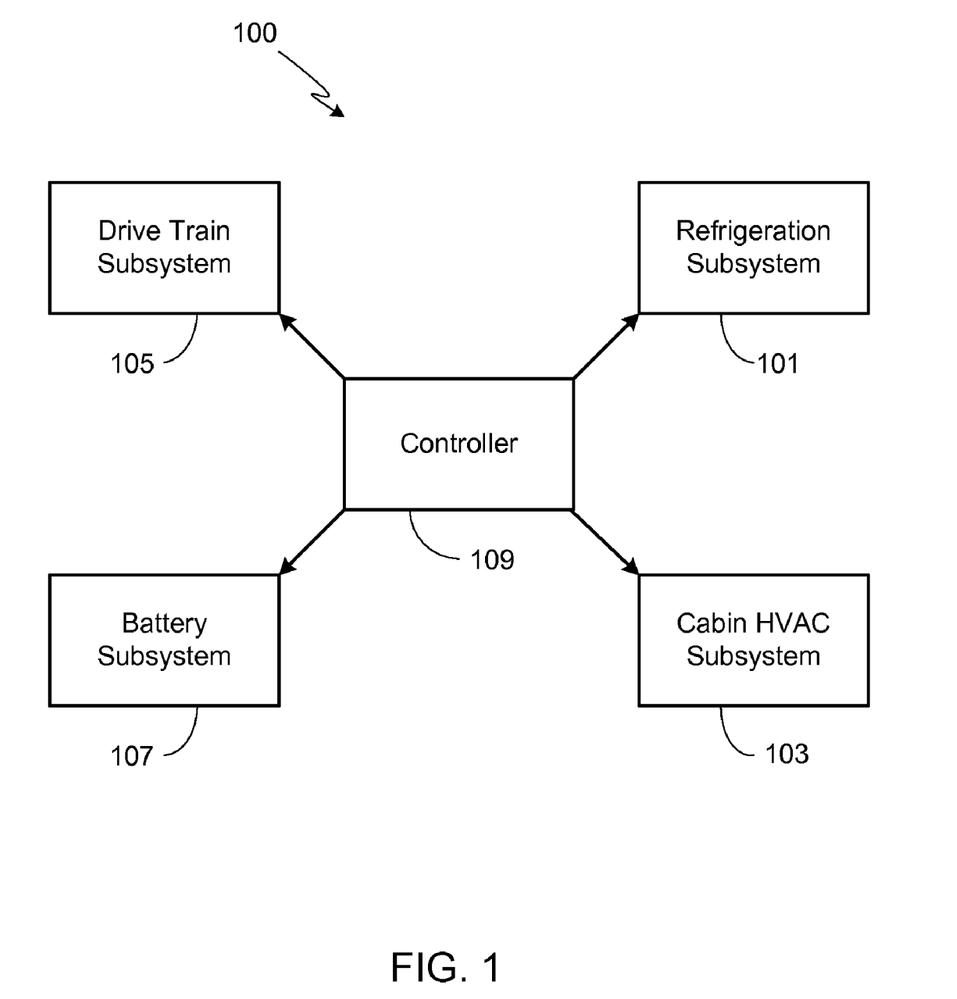
FIG. 1 provides a high level diagram of the various subsystems used in the thermal management system of the invention.

FIG. 1 is a high level diagram that illustrates the basic subsystems within the thermal management system 100 of a typical electric vehicle. In general, the thermal management system of such a vehicle includes a refrigeration subsystem 101, a passenger cabin HVAC subsystem 103, a drive train subsystem 105, and a battery subsystem 107. Thermal management system 100 also includes a controller 109. Controller 109 may be a dedicated thermal management system controller, or may utilize the vehicle control system, thereby reducing manufacturing cost and overall vehicle complexity. Further detail for each of these subsystems is provided below, some of which may be shown in the exemplary embodiments illustrated in FIGS. 2-5.

Refrigeration subsystem 101 is designed to be thermally coupled to one or more of the other thermal subsystems comprising system 100 whenever it is necessary or desirable to reduce the temperature in the thermally-coupled subsystem. Refrigeration subsystem 101, also referred to herein as a cooling subsystem, may utilize a refrigerant (e.g., R134a) compression system, a thermo-electric cooler, or other means. In a preferred embodiment shown in FIGS. 2-5, subsystem 101 includes a compressor 201 that compresses the low temperature refrigerant vapor in the subsystem into a high temperature vapor. The refrigerant vapor then dissipates a portion of the captured heat when it passes through condenser 203, thereby leading to a phase change from vapor to liquid, where the remaining liquid is at a temperature below the saturation temperature at the prevailing pressure. Preferably the performance of condenser 203 is enhanced by using a blower fan 205. The liquid phase refrigerant then passes through a receiver-dryer 207 that removes moisture from the condensed refrigerant. In the preferred embodiment, and as shown, refrigerant line 209 is coupled to a cabin evaporator 211 via a thermal expansion valve 213, and to a heat exchanger 215 (also referred to herein as a chiller) via a thermal expansion valve 217. Thermal expansion valves 213 and 217 control the flow rate of refrigerant into evaporator 211 and chiller 215, respectively.

Heating, ventilation and cooling (HVAC) subsystem 103 provides temperature control for the vehicle's passenger cabin, typically via a plurality of ducts and vents. Preferably HVAC subsystem 103 includes one or more fans 219 that are used to circulate air throughout the cabin on demand, regardless of whether the air is heated, cooled, or simply fresh air from outside the vehicle. To provide cool air, refrigerant is circulated through evaporator 211. To provide warm air during normal vehicle operation, HVAC subsystem 103 may utilize a heater 221, for example an electric heater (e.g., a PTC heater) integrated within evaporator 211. Although not shown, in an alternate embodiment HVAC subsystem 103 may include means such as a heat exchanger for transferring thermal energy from either drive train subsystem 105 or battery subsystem 109 to the HVAC subsystem.

Subsystem 105 is comprised of a continuous power train cooling loop 223 that is used to cool the drive motor 225, the vehicle's principal traction motor. While a single drive motor is shown, it will be appreciated that an EV utilizing the present invention may be designed to employ more than a single drive motor, for example a drive motor per axle or per wheel. Preferably cooling loop 223 is also thermally coupled to other vehicle electronic components, for example the power electronics module and inverter 227 for motor 225. If the system includes a charger 229, for example for charging a rechargeable battery using an external power source, preferably the charger is coupled to cooling loop 223 as well. Alternately, charger 229 may be coupled to the battery system cooling loop. In at least one embodiment, the system electronics (e.g., power electronics 227) are mounted to a cold plate that is used to transfer the heat away from the electronics and into the liquid coolant (i.e., the heat transfer medium) contained in the cooling loop. Cooling loop 223 also includes a pump 231 to circulate the coolant through the cooling loop, a radiator 233 for discharging the heat to the ambient atmosphere, and a coolant reservoir 235. Preferably the system also includes a fan 237 for forcing air through radiator 233 when insufficient air is passing through the radiator to achieve the desired level of cooling, for example when the vehicle is not moving. Subsystem 105 preferably also includes a valve 239, as shown, that allows radiator 233 to be decoupled from coolant loop 223. The position of valve 239 couples radiator 233 to coolant loop 223 in the exemplary embodiment shown in FIG. 2.

Battery subsystem 107 includes battery(s) 241 coupled to a coolant loop 243 containing a coolant (i.e., a heat transfer medium). In a typical electric vehicle, battery 241 is comprised of a plurality of batteries. One or more circulation pumps 245 pump the coolant through battery(s) 241, typically via a heat transfer plate or one or more coolant conduits (not shown) that are in thermal communication with the battery(s). Although a dedicated cooling subsystem may be used in conjunction with subsystem 107, preferably the coolant contained in loop 243 is cooled via heat transfer with the refrigerant in heat exchanger 215, assuming that the thermostatic valve 217 allows refrigerant from subsystem 101 to pass through heat exchanger 215. Additionally, in a preferred embodiment of the invention, cooling loop 243 is also thermally coupled to a heater 247 (e.g., a PTC heater), thus insuring that the temperature of battery(s) 241 can be maintained within its preferred operating range regardless of the ambient temperature.

It will be appreciated that there are numerous techniques that may be used by control system 109 to control the operation of the individual thermal management subsystems in general, and more specifically the amount of cooling supplied by refrigeration subsystem 101 to the other subsystems. Typically control system 109 uses a plurality of temperature detectors (not shown) to monitor the temperature within the various vehicle components (e.g., battery(s) 241, motor 225, drive electronics 227, etc.), within one or more regions of the coolant loops (e.g., coolant loop 223, etc.), and within one or more locations within the passenger cabin. The monitored temperatures at these various locations are used by control system 109 to determine the operation of the various thermal management subsystems. In response to the monitored temperatures and the desired temperature range for the cabin and the various vehicle components, the amount of heating and/or cooling applied by each subsystem is regulated, for example via flow valves (not shown) within the coolant loops, pump rates of the various circulation pumps (e.g., pumps 231 and 245), heater operation (e.g., heaters 221 and 247), and blower fan operation (e.g., fans 205, 219, 237). Controller 109 may operate automatically based on programming implemented by a processor, or system 109 may be manually controlled, or system 109 may use some combination of manual and automated control.

In addition to controlling refrigerant flow rates, coolant flow rates and the operation of the heaters, fans, etc., the present invention allows the overall architecture of the thermal management system to be quickly and easily altered, thus providing different means of controlling and routing thermal energy among the vehicle's subsystems. As a result, the thermal management system of the invention provides a sophisticated and flexible way to respond to changing environmental conditions (e.g., varying air temperature, solar loading, etc.) as well as changing vehicle component thermal loads and requirements.

Figure 2:
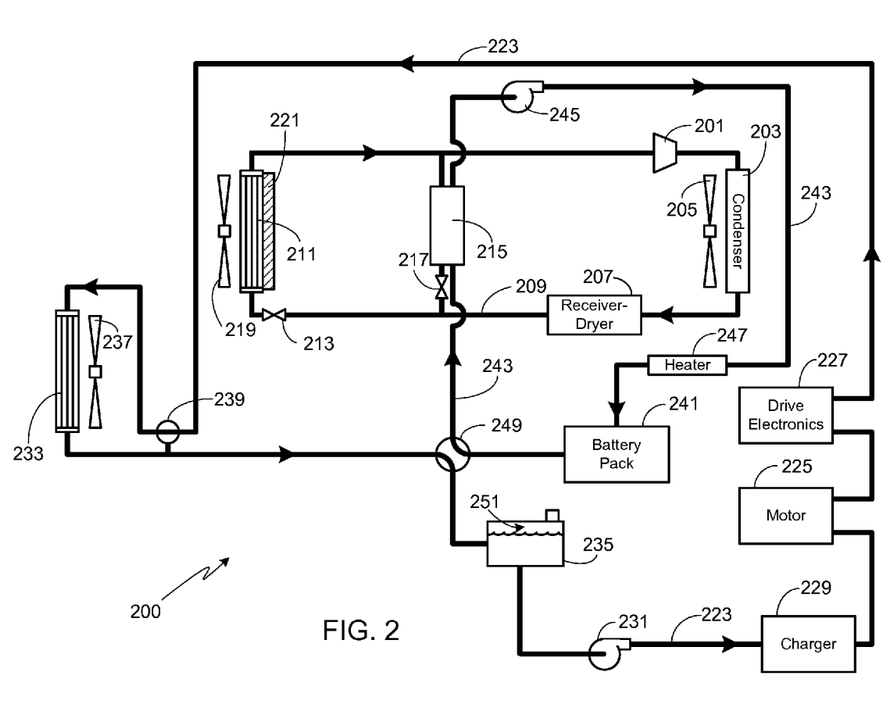
FIG. 2 illustrates a preferred embodiment of the architecture of a thermal management system in which the drive train and battery subsystems operate in parallel.
Figure 3:
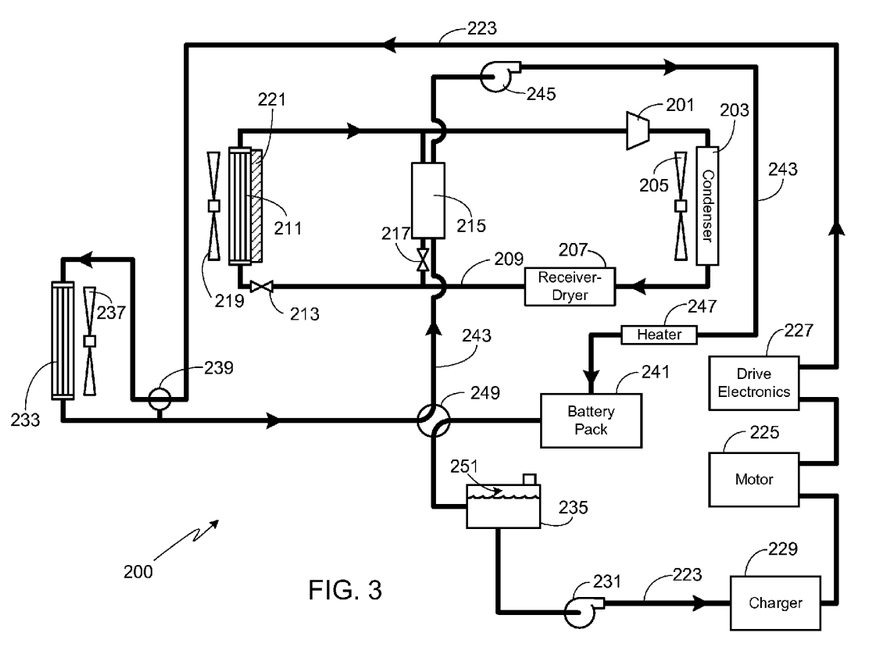
FIG. 3 illustrates the embodiment shown in FIG. 2, configured to allow the drive train and battery subsystems to operate in series.

In the configuration illustrated in FIG. 2, referred to herein as the parallel architecture, drive train subsystem 105 is operated independently of battery subsystem 107, with subsystem 107 not coupled to coolant reservoir 235. FIG. 3 illustrates thermal management system 200 reconfigured to allow serial operation of drive train subsystem 105 and battery subsystem 107. In system 200, this change in thermal architecture is achieved by repositioning valve 249. In this preferred embodiment of the invention, valve 249 is a four-way cylindrical, butterfly or ball valve.

In the serial configuration, coolant is initially pumped through coolant line 223, which is thermally coupled to drive motor(s) 225 and associated electronics (e.g., drive electronics 227, charger 229). After passing by the drive train components, and as shown in FIG. 3, valve 249 couples coolant line 223 to coolant line 243, thereby allowing the flowing coolant to pass through battery(s) 241 after being warmed by the drive train components as shown.

The ability to either place the battery and drive train coolant subsystems in series or in parallel, depending upon both the external environment and the immediate operating characteristics of the components, allows thermal and performance optimization of a vehicle's subsystems. It will be appreciated that such thermal and performance optimization, in turn, leads to improved efficiency and associated operating cost savings.

Preferably controller 109 is configured to automatically control valve 249 based on the operating characteristics of the vehicle components and ambient conditions, all of which are preferably monitored by controller 109. The determination of whether to operate subsystems 105 and 107 serially or in parallel is preferably made to optimize onboard energy usage, system thermal response and performance operating conditions. Some exemplary conditions for both serial and parallel operation are provided below.

Operating subsystem 105 and 107 serially, as shown in FIG. 3, improves system efficiency in a number of operating scenarios. For example:

When the vehicle is cold, for example after being garaged over night or for an extended period of time, serial operation allows the coolant to be heated by the drive train components before passing through the battery system. As many energy sources, for example rechargeable batteries, have a minimum preferred operating temperature, this configuration allows the heat generated by the drive train components to heat the batteries. In at least one embodiment of a vehicle using the invention, this form of operation allows the elimination of heater 247, thus reducing system complexity, initial cost, and operating cost. In at least one alternate embodiment of a vehicle using the invention, this form of operation allows a reduction in the size and output of heater 247, thus reducing initial and operating costs. Note that as the drive train components generally operate more efficiently at cooler temperatures, this mode of operation is typically used during driving when ambient temperatures are low and the batteries require heating, or when the vehicle is parked and the batteries require heating. In this mode, the temperature of the coolant and thus the efficiency of the system may be regulated by using valve 239 to select whether or not to pass the coolant through radiator 233 before it flows through the battery system. Fan 237 may be used to provide additional ambient airflow to increase heating if the ambient temperature exceeds the drive train outlet temperature.

In some situations the battery system may be too cold to be efficiently charged. By operating the subsystems serially, waste heat generated by charger 229 flows through the battery pack, thereby heating the batteries and allowing them to be efficiently charged with minimal, if any, supplemental heating by heater 247. An additional benefit of this approach is that it eliminates, or at least minimizes, the need to cool charger 229 during operation. Preferably in this mode, as the charger and the batteries heat up, they can be cooled (if necessary) by passing the coolant through radiator 233. Fan 237 may be used to provide additional cooling.

When the ambient temperature is relatively low, operating the subsystems serially allows both the drive train components and the battery system to be cooled using only radiator 233, with or without operation of fan 237, depending upon operating temperatures and vehicle speed. As a result, battery(s) 241 does not require cooling by cooling subsystem 101. Assuming that the cooling subsystem is not required for cabin cooling at this point in time, this mode of operation eliminates the need for operation of subsystem 101, further improving operational efficiency. Note that if necessary, coolant cooling may be augmented by cooling subsystem 101 via heat exchanger 215.

When the ambient temperature is extremely high, or if one or more of the vehicle's components is operating above its desired operating temperature, serial operation provides a convenient method for coupling the drive train coolant loop 223 to refrigeration subsystem 101 via heat exchanger 215. As shown in FIG. 3, in this operational mode the coolant in loop 223 may be cooled via refrigeration subsystem 101 below the temperature achievable via radiator 233 alone, and radiator 233 may be bypassed using valve 239 to avoid adding unwanted heat from the ambient environment to the refrigerated coolant. Additionally, even without operation of refrigeration subsystem 101, the drive train components benefit in this configuration by allowing excess drive train heat to be dumped into battery(s) 241, essentially using battery(s) 241 as a thermal capacitor.

FIG. 2 illustrates the parallel configuration for operating subsystems 105 and 107. A few exemplary operating scenarios include:

The parallel configuration allows independent temperature control over the drive train and battery subsystems, thus allowing each subsystem to be operated within its acceptable temperature range and with minimal expenditure of vehicle energy. This is clearly a beneficial configuration in an electric vehicle since the drive train subsystem can typically operate at much higher temperatures, and over a much larger range of temperatures, than is desirable for battery pack operation. Note that in this configuration battery(s) 241 may be cooled to whatever extent is desired through use of the refrigeration subsystem 101 and heat exchanger 215, or heated via heater 247. Control over the drive train components is achieved via radiator 233/fan 237 and radiator bypass valve 239.

In some instances, the batteries may already be at a preferred operating temperature even though the drive train is still cold. As most electric vehicle's utilize a drive train that does not require heat-up, parallel operation allows battery(s) 241 to be maintained at this temperature, or within the desired temperature range, even though the drive train is still heating up. Note that if it is desired, valve 239 can be used to bypass radiator 233, thus expediting drive train heat-up.

Depending upon the ambient temperature, in some instances during charging it is desirable to have independent temperature control of battery(s) 241 while cooling charger 229 solely via radiator 233.

It will be appreciated that at the heart of the invention is the ability to maximize system efficiency and/or improve system thermal performance by operating the drive train thermal subsystem and the battery thermal subsystem in either a serial configuration or a parallel configuration, depending upon the thermal needs of any of a variety of different system components (e.g., motor, charger, inverter, batteries, etc.), ambient temperature, vehicle speed, etc. Accordingly, it should be understood that the individual components and layout of the subsystems may vary from those in the exemplary embodiment without departing from the invention, e.g., the type of cooling/refrigeration subsystem, the way in which the cabin HVAC subsystem is coupled to the other subsystems, the number of heat exchangers, the number of circulating pumps/radiators/fans, etc. may all differ from system 200 without departing from the underlying invention.

Figure 4:
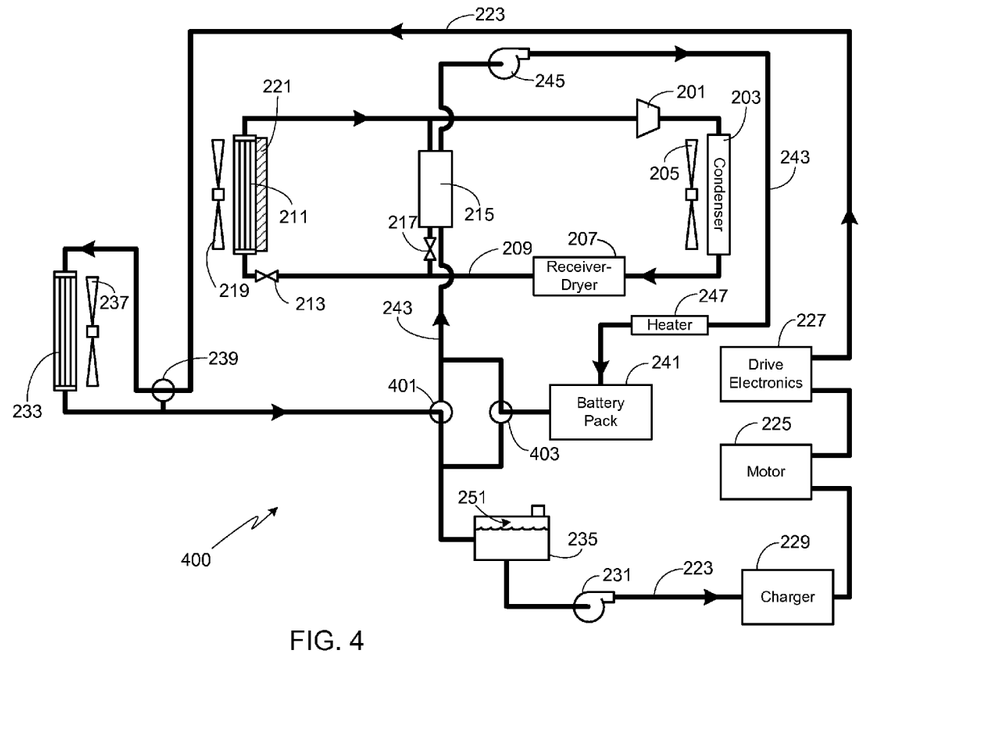
FIG. 4 illustrates the embodiment shown in FIG. 2, modified to use two, three-way valves instead of a single, four-way valve to switch between operational modes.
Figure 5:
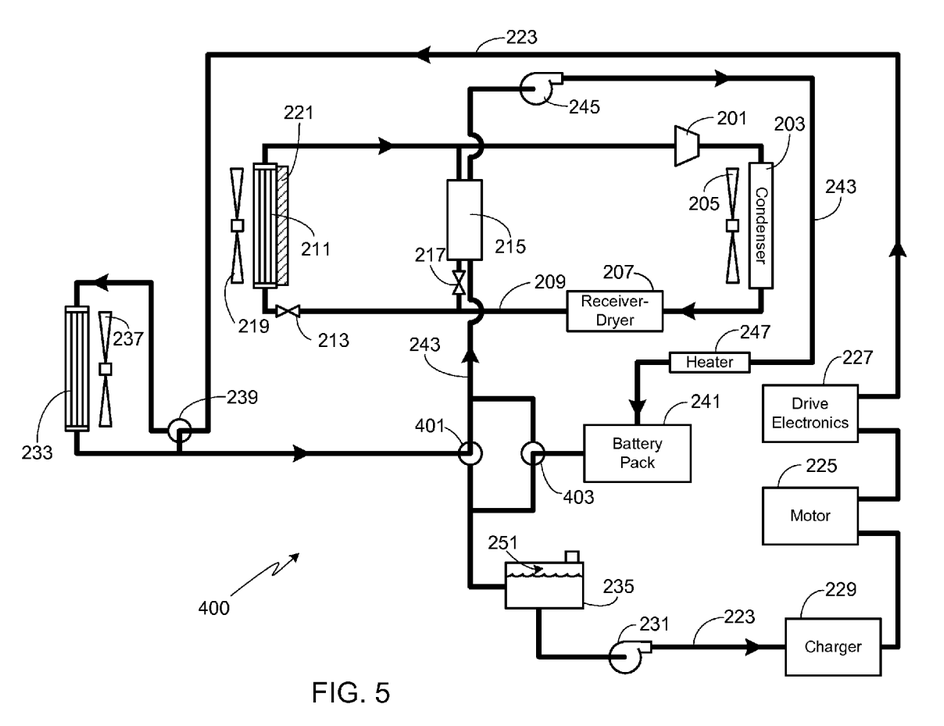
FIG. 5 illustrates the embodiment shown in FIG. 3, modified to use two, three-way valves instead of a single, four-way valve to switch between operational modes.
Figure 6:
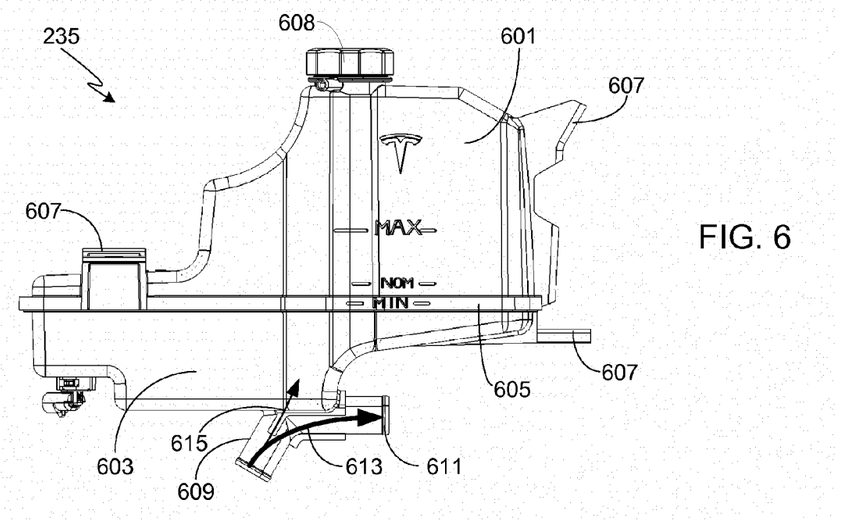
FIG. 6 provides a side view of a de-aeration reservoir used in a preferred embodiment of the invention.
Figure 7:
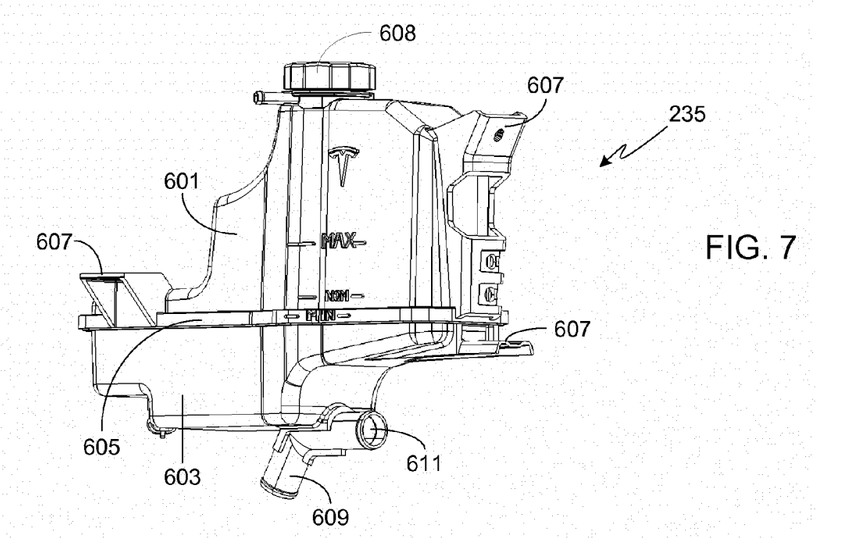
FIG. 7 provides a perspective view of the de-aeration reservoir shown in FIG. 6.
Figure 8:
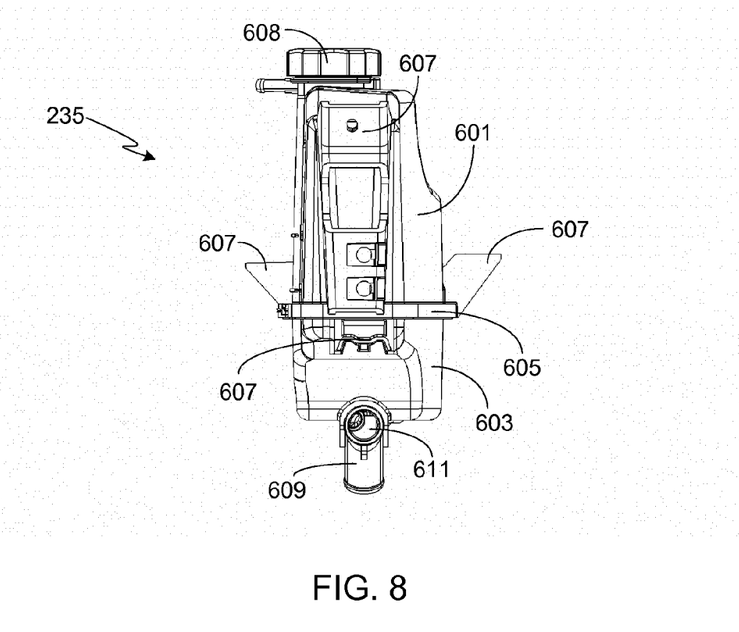
FIG. 8 provides an end view of the de-aeration reservoir shown in FIGS. 6 and 7.

FIGS. 4 and 5 correspond to a minor modification of the system shown in FIGS. 2 and 3, respectively, specifically replacing four-way valve 249 with a pair of three-way valves 401 and 403. Although systems 200 and 400 operate in the same manner and offer the same performance and efficiency advantages, it will be appreciated that the use of a single four-way valve is preferred over two, three-way valves in order to reduce part count, cost, and system complexity while improving reliability. Note that in FIG. 5 radiator bypass valve 239 is shown in the bypass position, as opposed to the active radiator position shown in FIG. 4, thus illustrating this aspect of the invention.

In at least one preferred embodiment of the invention, coolant reservoir 235 is comprised of a low pressure, de-aerating coolant reservoir as illustrated in FIGS. 6-10. While a variety of techniques may be used to fabricate and assemble reservoir 235, preferably it is fabricated from an upper member 601 and a lower member 603, the two members sealed together along seam 605. Members 601 and 603 are preferably fabricated from a plastic (e.g., e.g., polyethylene, polypropylene, polyvinyl chloride, polytetrafluoroethylene, etc.) that is transparent, or semi-transparent, thus allowing the level of coolant within the reservoir to be easily determined. Integral to reservoir 235 are a number of mounting flanges 607. The fill cap assembly 608 is also visible in these figures.

Within coolant reservoir 235 are a plurality of de-aeration chambers. In the illustrated reservoir, each de-aeration chamber is defined by an inner reservoir chamber surface as well as one or more internal partitions, each partition running from the lower most reservoir surface to the upper most reservoir surface, and running either between a pair of opposed reservoir side surfaces, or between a reservoir side surface and another partition, or between a pair of partitions. As a result of this design, except for small apertures that interconnect de-aeration chambers and direct coolant flow, the volume within each de-aeration chamber is completely segregated from the adjacent de-aeration chambers.

Coolant enters reservoir 235 via inlet 609, and passes out of reservoir 235 via outlet 611. Coolant inlet 609 and outlet 611 preferably are coupled to the bottom of reservoir 235, although other configurations such as a side-mounted inlet/outlet configuration may be used. The reservoir inlet/outlet (i.e., inlet 609 and outlet 611) share a common coolant flow pathway, thus allowing a portion of the coolant to by-pass the de-aeration reservoir all together and flow unheeded through the designated coolant loop. This design also allows a small portion of the coolant to pass into the de-aeration chamber without the use of one or more bleed lines as is common. In the preferred embodiment, at least 90% of the coolant flows directly between inlet 609 and outlet 611 via common flow path 613 while the remaining portion, i.e., less than 10%, follow pathway 615 into the de-aeration reservoir. Preferably the amount of coolant passing into de-aeration reservoir 235 is between 5 and 8 percent, thus allowing between 92 and 95 percent of the coolant to bypass reservoir 235. The amount of fluid that passes into reservoir 235 is primarily determined by the size of the reservoir inlet aperture 913.

Figure 9:
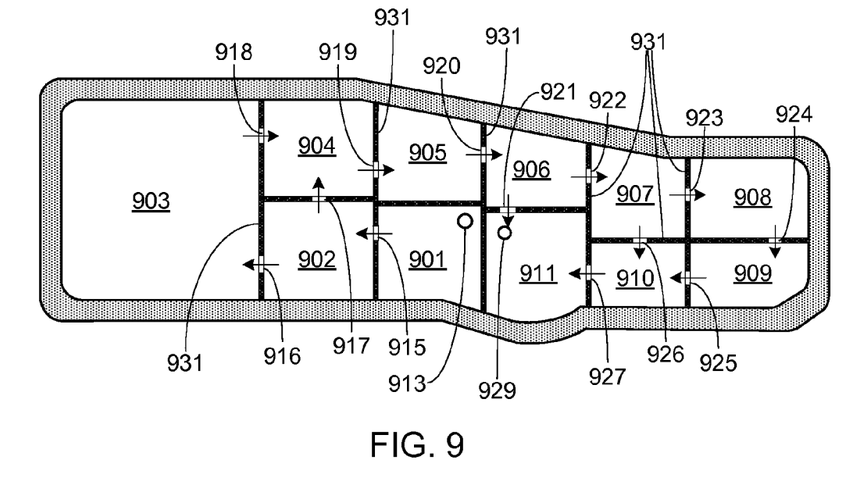
FIG. 9 provides a representation of a horizontal cross-section of the de-aeration reservoir shown in FIGS. 6-8, this figure illustrating coolant flow through the de-aeration chambers of the reservoir.

FIG. 9 provides a representation of a horizontal cross-section of reservoir 235, this figure showing the flow of coolant through reservoir chambers 901-911. Although the number of de-aeration chambers as well as the number, size and shape of the apertures that interconnect the de-aeration chambers have been optimized for the requirements of a specific cooling system, it should be understood that other configurations may be used with the invention.

De-aeration chambers 901-911, as well as partition apertures 915-927, are designed to reduce coolant fluid velocity and turbulence intensity. By reducing fluid velocity and turbulence, air trapped within the coolant is allowed to rise out of solution. Similarly, particulate matter trapped within the coolant tends to collect at the bottom of the reservoir instead of remaining trapped within the flowing coolant. Reduction of trapped air improves the thermal capacity of the coolant while reduction of particulate matter minimizes pump wear (e.g., pumps 231 and 245) as well as the risks of blocked passageways within a heat exchanger (e.g., heat exchangers 211 and 233).

As previously noted, a portion of the coolant that enters inlet 609 passes through reservoir aperture 913 into de-aeration chamber 901. The coolant exits chamber 901 and enters chamber 902 via aperture 915. After entering chamber 902, the coolant can pass either into large chamber 903 via aperture 916, or into chamber 904 via aperture 917. Note that the coolant that flows into chamber 903 also passes into chamber 904, although via aperture 918. The larger dimensions of chamber 903 (i.e., on the order of 3 to 4 times the volume of the other de-aeration chambers) helps to further reduce coolant velocity and turbulence. The coolant passes from chamber 904 into chamber 905 via aperture 919, then into chamber 906 via aperture 920. A portion of the fluid within chamber 906 continues to chamber 907, then chamber 908, then chamber 909, then chamber 910 before passing into final de-aeration chamber 911. Another portion of the coolant within chamber 906 passes directly into the final de-aeration chamber 911 via aperture 921. The fluid in final de-aeration chamber 911 passes out of the reservoir through aperture 929 where it re-enters the flow of coolant from inlet 609 to outlet 611 (i.e., flow pathway 613).

As a result of the configuration of reservoir 235 in which a small portion (i.e., less than 10%, typically on the order of 5%-8%) is drawn off of the coolant flow, minimal pressure loss is introduced into the cooling loop. This, in turn, results in a very efficient cooling system in which coolant is continually withdrawn for de-aeration and re-admitted into the coolant flow.

Figure 10:
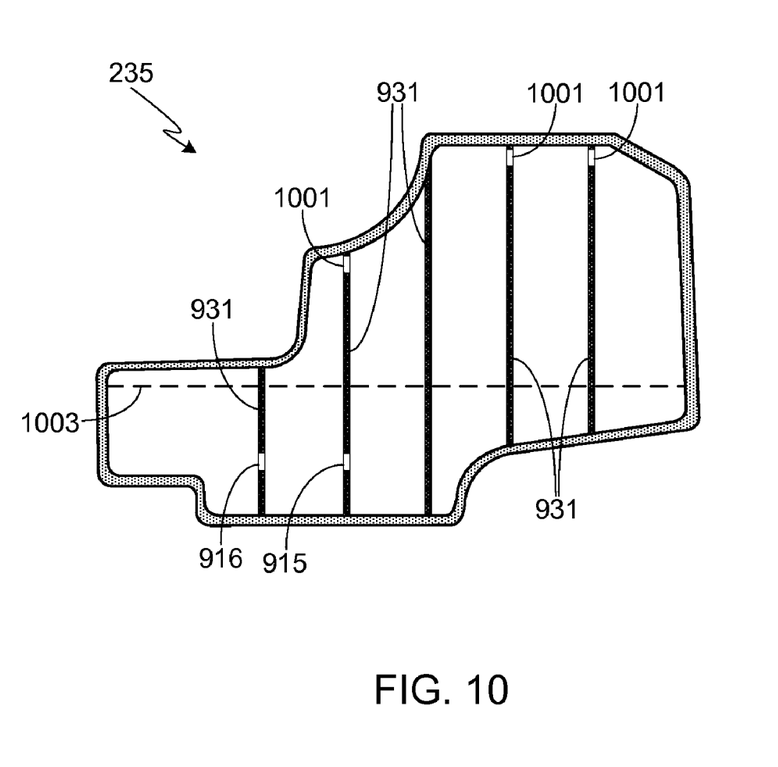
FIG. 10 provides a representation of a vertical cross-section of the de-aeration reservoir shown in FIGS. 6-9, this figure illustrating both coolant and air flow apertures within the de-aeration chambers.
Figure 11:
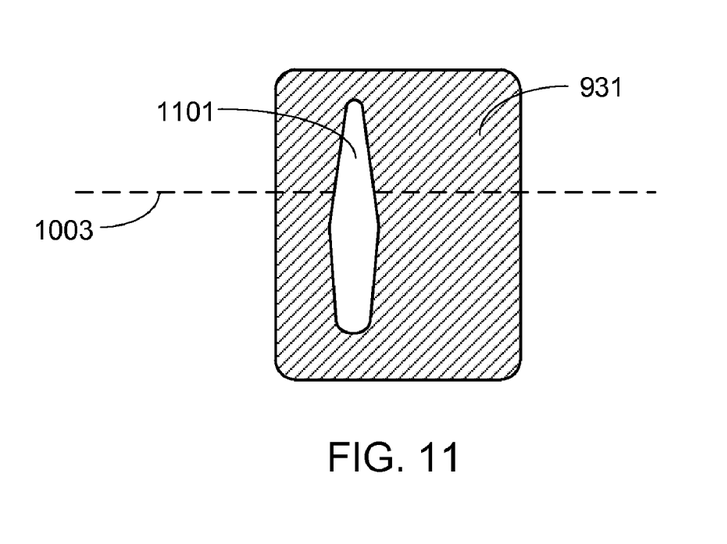
FIG. 11 provides a side view of a shaped aperture that may be used with the reservoir shown in FIG. 6-9.

In a typical configuration, the cooling system is sealed and the air removed during the de-aeration process simply collects near the top of reservoir 235. If the pressure within reservoir becomes too great, a pressure relief valve allows a small amount of air to be released, sufficient to reduce the pressure to an acceptable level. In a preferred configuration the pressure relief valve, which may be a stand-alone valve or integrated within fill cap assembly 608, is designed to open at a pressure of 5 psi. In at least one embodiment of the reservoir, in addition to the de-aeration partition apertures 915-927 that direct coolant flow between chambers, the partitions (e.g., partitions 931) also include apertures that allow air released during the de-aeration process to move between chambers, thus simplifying removal of released air from reservoir 235. FIG. 10 provides a representation of a vertical cross-section of reservoir 235, this figure showing a couple of the partition apertures that direct coolant flow (e.g., apertures 915 and 916) as well as several apertures 1001 that provide air passageways between de-aeration chambers. In order for the de-aeration process to function properly, de-aeration apertures 915-927 that are intended to direct coolant flow through the reservoir are located below the coolant line (e.g., coolant fluid line 1003), while the partition apertures 1001 that are intended to allow air flow between de-aeration chambers are located above coolant fluid line 1003. In an alternate preferred configuration, reservoir 235 utilizes shaped apertures that extend both above and below the nominal coolant level (e.g., fluid level 1003), thus controlling fluid flow between de-aeration chambers as well as allowing a pathway for air to pass between chambers. FIG. 11 provides an illustration of one such shaped aperture 1101 located within a chamber partition 931. As shown in FIG. 11, a first portion of shaped aperture 1101 falls below the nominal coolant level 1003 while a second portion of the aperture is located above nominal coolant level 1003.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A dual mode, vehicle thermal management system, comprising:
   a first coolant loop in thermal communication with a battery system, said first coolant loop comprising a first circulation pump for circulating a coolant within said first coolant loop;
   a second coolant loop in thermal communication with at least one drive train component, said second coolant loop comprising a second circulation pump for circulating said coolant within said second coolant loop;
   a dual mode valve system, wherein said first coolant loop operates in parallel with and separate from said second coolant loop when said valve system is configured in a first mode, and wherein said first coolant loop is serially coupled to said second coolant loop when said valve system is configured in a second mode; and
   a coolant reservoir, wherein said coolant within said second coolant loop is coupled to said coolant reservoir when said valve system is configured in either said first mode or said second mode, wherein said coolant within said first coolant loop is coupled to said coolant reservoir when said valve system is configured in said second mode, and wherein said coolant within said first coolant loop is not coupled to said coolant reservoir when said valve system is configured in said first mode.

2. The dual mode, vehicle thermal management system of claim 1, wherein said dual mode valve system is comprised of a four-way valve, wherein said four-way valve configured in said first mode couples a first valve inlet to a first valve outlet and couples a second valve inlet to a second valve outlet, and wherein said four-way valve configured in said second mode couples said first valve inlet to said second valve outlet and couples said second valve inlet to said first valve outlet.

3. The dual mode, vehicle thermal management system of claim 1, wherein said dual mode valve system is comprised of a four-way valve, wherein said four-way valve configured in said first mode couples a first portion of said first coolant loop to a second portion of said first coolant loop and couples a first portion of said second coolant loop to a second portion of said second coolant loop, and wherein said four-way valve configured in said second mode couples said first portion of said first coolant loop to said second portion of said second coolant loop and couples said first portion of said second coolant loop to said second portion of said first coolant loop.

4. The dual mode, vehicle thermal management system of claim 1, wherein said dual mode valve system is comprised of a first three-way valve and a second three-way valve, wherein said first three-way valve couples a first portion of said first coolant loop to a second portion of said first coolant loop when said dual mode valve system is configured in said first mode, wherein said second three-way valve couples a first portion of said second coolant loop to a second portion of said second coolant loop when said dual mode valve system is configured in said first mode, wherein said first three-way valve couples said first portion of said first coolant loop to said second portion of said second coolant loop when said dual mode valve system is configured in said second mode, and wherein said second three-way valve couples said first portion of said second coolant loop to said second portion of said first coolant loop when said dual mode valve system is configured in said second mode.

5. The dual mode, vehicle thermal management system of claim 1, wherein said battery system is comprised of a plurality of batteries.

6. The dual mode, vehicle thermal management system of claim 1, further comprising a refrigeration subsystem in thermal communication with said first coolant loop.

7. The dual mode, vehicle thermal management system of claim 6, further comprising a heat exchanger, wherein said refrigeration subsystem is in thermal communication with said first coolant loop via said heat exchanger.

8. The dual mode, vehicle thermal management system of claim 6, further comprising a heat exchanger, wherein said refrigeration subsystem is in thermal communication with said first coolant loop via said heat exchanger, and wherein said refrigeration subsystem further comprises a refrigerant, a compressor, a condenser and a thermostatic expansion valve.

9. The dual mode, vehicle thermal management system of claim 1, said first coolant loop further comprising a heater.

10. The dual mode, vehicle thermal management system of claim 1, wherein said at least one drive train component is comprised of at least one of a drive motor and a drive electronics, said drive electronics comprising an inverter.

11. The dual mode, vehicle thermal management system of claim 1, further comprising a charger in thermal communication with said second coolant loop.

12. The dual mode, vehicle thermal management system of claim 1, said second coolant loop further comprising a radiator.

13. The dual mode, vehicle thermal management system of claim 1, said second coolant loop further comprising a bypass valve, wherein said bypass valve in a first position couples said second coolant loop to a radiator, and wherein said bypass valve in a second position decouples said radiator from said second coolant loop.

14. The dual mode, vehicle thermal management system of claim 1, further comprising:
   a refrigeration subsystem comprising a heat exchanger, wherein said first coolant loop is in thermal communication with said refrigeration subsystem via said heat exchanger; and
   a cabin heating, ventilation and cooling (HVAC) subsystem coupleable to said refrigeration subsystem.

15. A method of managing thermal loads within an electric vehicle, the method comprising the steps of:
   selecting between a first mode and a second mode of circulating a coolant through a drive train coolant loop and a battery system coolant loop, wherein in said first mode, the method further comprises the steps of:
- circulating said coolant through said drive train coolant loop, said drive train coolant loop in thermal communication with at least one drive train component, wherein said drive train coolant loop is coupled to a coolant reservoir; and
- circulating said coolant through said battery system coolant loop, said battery system coolant loop in thermal communication with a battery system, wherein said step of circulating said coolant through said battery system coolant loop is performed in parallel with said step of circulating said coolant through said drive train coolant loop, and wherein said battery system coolant loop is not coupled to said coolant reservoir; and wherein in said second mode, the method further comprises the steps of:
- serially circulating said coolant through said drive train coolant loop and said battery system coolant loop, wherein said drive train coolant loop and said battery system coolant loop are both coupled to said coolant reservoir.

16. The method of claim 15, wherein in said first mode the method comprises the steps of coupling a first portion of said drive train coolant loop to a second portion of said drive train coolant loop and coupling a first portion of said battery system coolant loop to a second portion of said battery system coolant loop, and wherein in said second mode the method comprises the steps of coupling said first portion of said drive train coolant loop to said second portion of said battery system coolant loop and coupling said first portion of said battery system coolant loop to said second portion of said drive train coolant loop.

17. The method of claim 16, wherein said selecting step further comprises the steps of positioning a four-way valve in either a first position corresponding to said first mode, or in a second position corresponding to said second mode.

18. The method of claim 16, wherein in said first mode the method further comprises the steps of positioning a first three-way valve in a first position and positioning a second three-way valve in a first position, and wherein in said second mode the method further comprises the steps of positioning said first three-way valve in a second position and positioning said second three-way valve in a second position.

19. The method of claim 15, further comprising the step of thermally coupling said drive train coolant loop to a charger.

20. The method of claim 15, further comprising the step of thermally coupling said battery system coolant loop to a refrigeration subsystem via a heat exchanger, wherein said step of thermally coupling said battery system coolant loop to said refrigeration subsystem is performed when additional battery system cooling is desired.

21. The method of claim 15, further comprising the step of thermally coupling said battery system coolant loop to a heater, wherein said step of thermally coupling said battery system coolant loop to said heater is performed when additional battery system heating is desired.

22. The method of claim 15, further comprising the step of coupling said drive train coolant loop to a radiator when additional drive train cooling is desired.

23. The method of claim 22, further said step of coupling said drive train coolant loop to said radiator is performed using a bypass valve.

* * * * *